United States Patent

[11] 3,633,914

[72] Inventor Jack Solomon
        3970 Green St., Harrisburg, Pa. 17110
[21] Appl. No. 865,430
[22] Filed Oct. 10, 1969
[45] Patented Jan. 11, 1972

[54] EDUCATIONAL GAME APPARATUS
     2 Claims, 3 Drawing Figs.
[52] U.S. Cl.......................................................... 273/135 B
[51] Int. Cl............................................................ A63f 3/00
[50] Field of Search.............................................. 273/135,
                                                    136; 35/35, 40, 71

[56] References Cited
     UNITED STATES PATENTS
     2,170,033  8/1939  Pittinger....................... 273/136
     3,464,124  9/1969  Lynd............................. 35/35
     FOREIGN PATENTS
     1,388,675  1/1965  France.......................... 273/135

*Primary Examiner*—Delbert B. Lowe
*Attorney*—Sherman and Shalloway

ABSTRACT: A game apparatus comprising a master board and a set of player boards, each board having descriptive headings arranged in a row and a column and defining a grid consisting of blank areas, a stack of cards each bearing two related headings and information which correlates the headings, the grid areas on the master board being dimensioned to receive said cards, and a plurality of marker chips for placement on the grid areas of said bearing card.

|  | UNITED STATES | ENGLAND | FRANCE | GERMANY | ITALY | JAPAN | CHINA | IRELAND | SCOTLAND | INDIA |
|---|---|---|---|---|---|---|---|---|---|---|
| FOLK DANCES |  |  |  |  | 14 |  |  |  |  |  |
| SONGS & MUSIC |  |  |  |  |  |  |  |  |  |  |
| DIALECTS & LANGUAGES |  |  |  |  |  |  |  |  |  |  |
| FAMOUS PLACES & LANDMARKS |  |  |  |  |  |  |  |  |  |  |
| COSTUMES |  |  |  |  |  |  |  |  |  |  |
| MONEY |  |  |  | 18 |  |  |  |  |  |  |
| FOODS & BEVERAGES |  |  | CRÊPE SUZETTE FRANCE Food |  |  |  |  |  |  |  |
| FIGURES IN FOLKLORE |  |  |  |  |  |  |  |  |  |  |
| GAMES & SPORTS |  |  |  |  |  |  |  |  |  |  |
| SPECIAL PRODUCTS |  |  |  |  |  |  |  |  |  |  |

FIG. 1

| | UNITED STATES | ENGLAND | FRANCE | GERMANY | ITALY | JAPAN | CHINA | IRELAND | SCOTLAND | INDIA |
|---|---|---|---|---|---|---|---|---|---|---|
| FOLK DANCES | | | | | | | | | | |
| SONGS & MUSIC | | | | | | | | | | |
| DIALECTS & LANGUAGES | | | | | | | | | | |
| FAMOUS PLACES & LANDMARKS | | | | | | | | | | |
| COSTUMES | | | | | | | | | | |
| MONEY | | | | | | | | | | |
| FOODS & BEVERAGES | | | CRÊPE SUZETTE FRANCE FOOD | | | | | | | |
| FIGURES IN FOLKLORE | | | | | | | | | | |
| GAMES & SPORTS | | | | | | | | | | |
| SPECIAL PRODUCTS | | | | | | | | | | |

INVENTOR
JACK SOLOMON

BY *Sherman & Shalloway*
ATTORNEYS

PATENTED JAN 11 1972

3,633,914

| | FRANCE | JAPAN | IRELAND | GERMANY | INDIA |
|---|---|---|---|---|---|
| FOLK DANCES | | | | | |
| FAMOUS PLACES & LANDMARKS | | | | | |
| COSTUMES | | | | | |
| FOODS & BEVERAGES | 20 | | | | |
| SPECIAL PRODUCTS | | | | | |

INVENTOR

JACK SOLOMON

BY *Sherman & Galloway*

ATTORNEYS

EDUCATIONAL GAME APPARATUS

SUMMARY OF THE INVENTION

This invention relates to an educational type game where a caller and two or more players participate. The caller is equipped with a master board and a stack of information-bearing cards, while the players are supplied with individual boards and chips, or the like thereof.

The boards have headings arranged along the coordinate axes and defining a system of columns and rows, and further so that the intersection of said columns and rows results in a unique relationship between the headings found therealong. The master board is inclusive of the aggregate of heading found on said player boards and said cards so that the caller can control the progress of the game and so that a player can react to the reading of the information on any card by the caller and indicate with a chip, or the like thereof, that the headings correlated by said information are also contained on the player card.

The game of the present invention involves, in addition to chance, knowledge in a particular field. The knowledge required may relate to a wide variety of subjects ranging from sports to science to the arts, as exemplary, and in both a historical and contemporary context.

It is therefore an object of the present invention to provide a game which is both enjoyable and instructional to the participants.

Other objects of the invention will appear from the following description taken in conjunction with the drawings which accompany and form part of this specification.

DESCRIPTION OF THE DRAWINGS

Referring to the accompanying drawings wherein like numerals of reference indicate like elements throughout the several views.

FIG. 1 represents the master board of the caller with a card in position;

PREFERRED EMBODIMENT

Figures 2, 3:
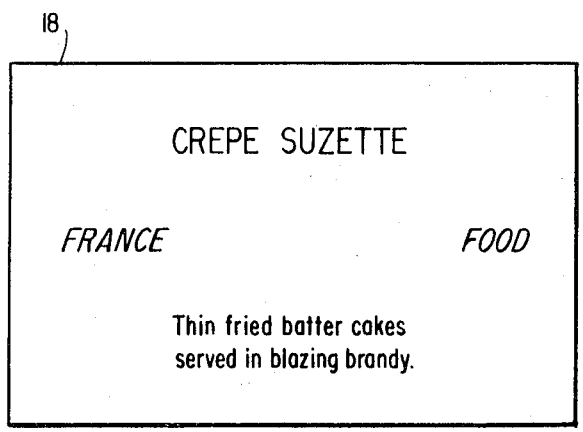
FIG. 2 represents a player board with a chip in position corresponding to the information contained on the card of FIG. 1 and 3.
FIG. 3 represents the card shown in FIG. 1 and the information contained thereon.

FIG. 1 shows the caller's master board 10 with a card 18 in position subsequent to a call. The board 10 has arranged on its face a grid network 11 forming an array of columns and rows. The columns are headed by the name of a particular country, while the rows are identified by a particular topic selected from the arts, sports, science, etc. The intersection of any column and row is representative of a unique relationship existing between the headings.

In the embodiment shown, ten columns and an equal number of rows are employed, it being readily apparent, however, that any number of such columns and rows could be used.

FIG. 2 shows a player card 12 which is similar in all respects to the master board 10. Here again a series of columns and rows, forming a grid system, are provided with appropriate headings therefor. The countries which are shown along axis 14 and the topics which are shown along axis 16 are selected from those contained on the master board 10, so that the aggregate of the headings contained on all the player boards forms the contents of the master board. It should be pointed out, in this respect, that it is possible to have any number of players using identical boards without in any way hampering the functioning of the game, since it is quite possible that no two of said number possess equal depth of knowledge with respect to the particular topics and countries involved, but that even if they do, multiple winners are not undesirable.

A player disc 20 is shown in position on card 12, being placed there by a player as a result of a call which was made by the caller, and corresponds to the placing of the card 18 positioned by the caller on master board 10.

In the particular game illustrated, the player is required to have knowledge relating to the various topics selected and be able to associate the innumerable specific items contained in any one topic with the country which it more properly can be identified with.

To play the game, one nonplayer, the caller, and two or more players are required. The caller is supplied with any number of cards 18 having information as exemplified by FIG. 3 which identifies one of the intersections of the columns and rows, while the players are supplied with blank discs 20 which are used to mark one of the column nd row intersections of a particular board. Other means may, of course, be used to mark the intersections. For example, more expensive player boards may be constructed with windows or slots and with tabs which may be pulled across the window or slot by the player. For the purpose of the present description, it will be assumed, however, that discs are used.

In playing the game, the caller shuffles the cards 18 and then places them face down in a stack before him. He then calls out the information contained on the card exclusive of the country and topic. For example, referring to FIG. 3, the caller would announce the content of card 18 by calling "-crepe suzette." He would then be directed, again by the card, to place same at the intersection of France and Foods and Beverages. The player who knows that crepe suzette is a French food would place a disc at the appropriate intersection on his card which corresponds to the intersection marked by the caller. The game would proceed in this fashion until a diagonal, horizontal or vertical line is completed on one or more players cards.

When a player has completed a line, he may call out some chosen word, such as "Thinkofit." The caller then checks the player's completed line against the master board. If the player has made an error, the player is eliminated from that particular game and the game continued.

If two or more players complete a line together, it could be further required that the players elucidate as to the subject matter of the various items called. For example, the player who knows that crepe suzettes are thin fried batter cakes served in blazing brandy is awarded that intersection over the player who knows that crepe suzette is French food. In this manner the player awarded the most intersections in a line is the winner.

A preferred embodiment of the invention having been described, which is set forth by way of example only and not intended to limit the invention, modifications evidencing a reasonable range of equivalents will become apparent to those skilled in the art.

What is claimed is:

1. An educational game comprising:
   a. a master board having a plurality of descriptive headings, said descriptive headings being arranged in a row and a column such that said headings define a grid, said grid consisting of blank areas
   b. information bearing cards, said cards having one descriptive column heading and one descriptive row heading to facilitate correct placing of said information bearing cards on said master board and information relating to a relationship between said descriptive column heading and said row heading, said cards corresponding to and having a unique relation to the grid areas on said master board, the number of information bearing cards corresponding exactly to the number of grid areas on the master board, said cards having the same shape and size as said grid areas;
   c. a plurality of player boards, each player having a plurality of descriptive headings arranged in a row and a column and defining a plurality of grid areas, the number of grid areas on each player board being less than the total number of grid areas on said master board; and
   d. means for marking said player boards in a grid area in correspondence to a particular information player boards.

2. The educational type game as defined in claim 1, wherein said marking means are chips.